United States Patent
Shanks et al.

(10) Patent No.: US 9,333,897 B1
(45) Date of Patent: May 10, 2016

(54) MONKEY GRABS CARGO HOLD

(71) Applicants: Dale Shanks, Corona, CA (US);
Michael Lopez, Corona, CA (US)

(72) Inventors: Dale Shanks, Corona, CA (US);
Michael Lopez, Corona, CA (US)

( * ) Notice: Subject to any disclaimer, the term of this patent is extended or adjusted under 35 U.S.C. 154(b) by 0 days.

(21) Appl. No.: 14/552,246

(22) Filed: Nov. 24, 2014

(51) Int. Cl.
*B60P 7/08* (2006.01)

(52) U.S. Cl.
CPC .................... *B60P 7/0876* (2013.01)

(58) Field of Classification Search
CPC .................................................... B60P 7/0876
USPC ............. 410/97, 100, 117, 118, 129; 87/2, 12
See application file for complete search history.

(56) References Cited

U.S. PATENT DOCUMENTS

| | | | |
|---|---|---|---|
| 2,839,804 A | 7/1955 | Benoit | |
| 4,964,771 A * | 10/1990 | Callihan | B60P 7/0823 410/118 |
| 5,458,447 A | 10/1995 | Clason | |
| 5,673,464 A | 10/1997 | Whittaker | |
| 6,123,294 A * | 9/2000 | Genovese | 410/118 |
| D580,257 S | 11/2008 | Squyres | |
| 8,590,116 B2 | 11/2013 | Dahl | |
| D703,027 S | 4/2014 | Vick et al. | |
| 8,950,989 B1 * | 2/2015 | Rivera | 410/118 |

* cited by examiner

*Primary Examiner* — Stephen Gordon
(74) *Attorney, Agent, or Firm* — Kirk A. Buhler; Buhler & Associates

(57) ABSTRACT

Improvements in a cargo holder are disclosed. The cargo hold is configurable to accommodate a variety of different shapes and sizes to retain cargo or boxes in an essentially fixed secure position. Monkey Grabs cargo hold takes the standard four tied down areas in the bed of a vehicle and convert to 24 optional tied down areas. The cargo hold does not include any metal components. The cargo hold has multiple securing loops along lengths of the straps for a user to connect into the ends and along the length of the strap to create additional securing locations. This makes the cargo hold a far more useful cargo hold. The cargo hold is configured in a rectangular configuration to connect along the sides of the bed of a truck and also placed across the bed for more versatile uses of the monkey grip cargo hold.

6 Claims, 3 Drawing Sheets

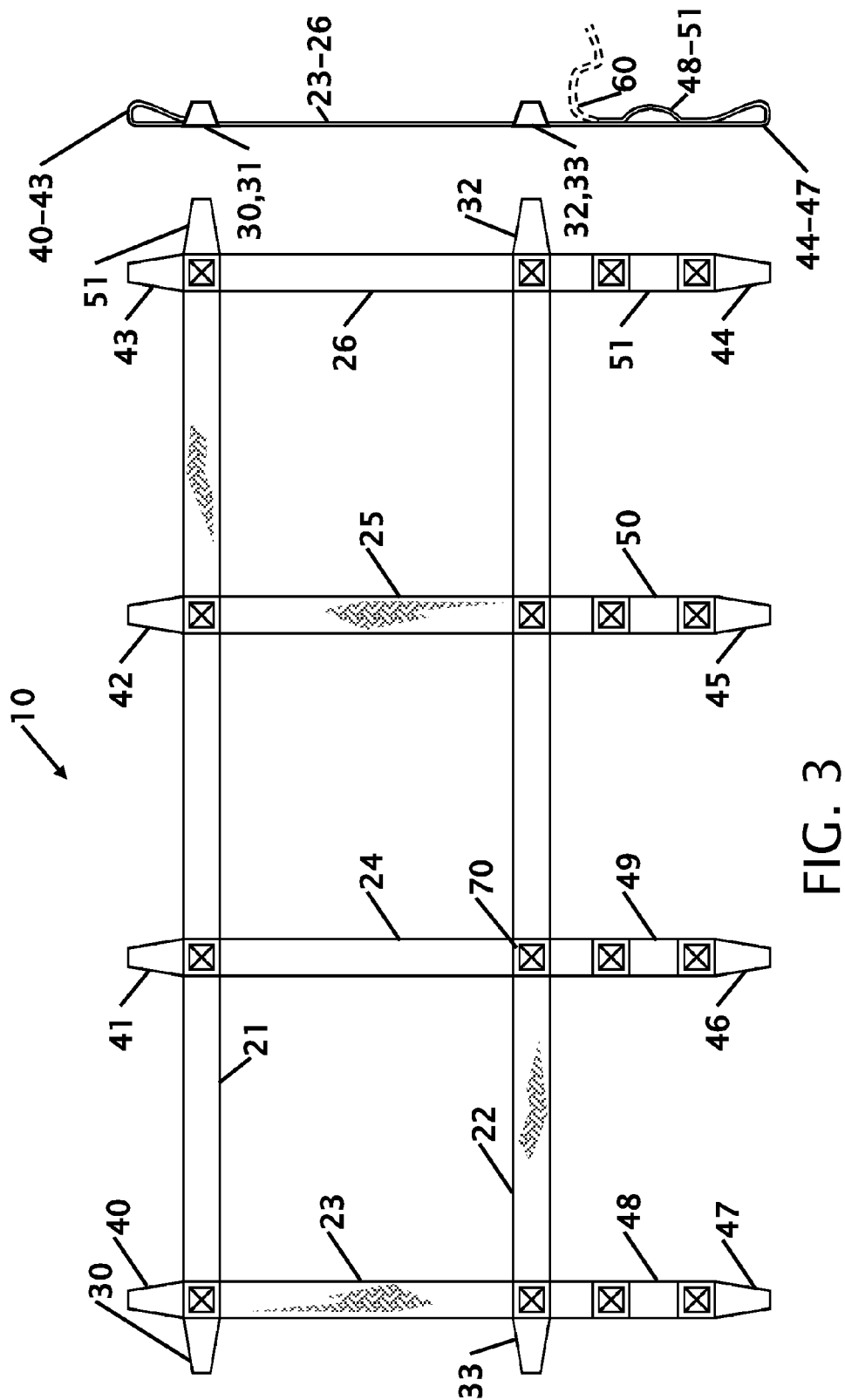

MONKEY GRABS CARGO HOLD

BACKGROUND OF THE INVENTION

1. Field of the Invention

This invention relates to improvements in a holding strap system. More particularly, the present monkey grip cargo hold is a matrix of straps sewn together with open loops of strap material to allow the monkey grip cargo hold to be secured with other strapping materials to retain cargo.

2. Description of Related Art Including Information Disclosed Under 37 CFR 1.97 and 1.98.

For many truck and vehicle owners cargo needs to be transported in their vehicle at one time or another. Most truck beds are configured with one or more connection or tie-down locations for securing the cargo. These locations are usually placed at locations that are convenient to the manufacturer of the vehicle or at the corners of the bed. While these locations are convenient for manufacturing, the size and shape of the cargo often dictates the ideal location for the securing locations. There are several cargo securing devices or nets that can be placed over the cargo and then secured to the location in the vehicle or truck, but often these devices provide limited support and also limited to the pre-defined connection and securing locations.

A number of patents and or publications have been made to address these issues. Exemplary examples of patents and or publication that try to address this/these problem(s) are identified and discussed below.

U.S. Pat. No. 5,458,447 issued on Oct. 17, 1995 to Richard L. Clason discloses a Cargo Restraint. The cargo restraint comprises of weather resistant straps attached to each other to form a lattice webbing which when coupled with adjustable self-locking buckles and flat hooks. While the cargo restraint can be used to secure cargo, the lattice fixes the straps at specific locations and does not provide for additional loops of material to secure the restraint at other locations.

U.S. Pat. No. 5,673,464 issued on Oct. 7, 1997 to Mark Whittaker discloses a Cargo Securement System and Tie Down Strap. This patent is a main body portion comprising two side members that extend between the two end portions in spaced parallel relation and a plurality of bridge portions that extend between and secure the two side members in their parallel relation. The system has six securing locations that help to hold down a rectangular box or container, but provides limited support to hold multiple items, or irregularly shaped items.

U.S. Pat. No. 8,590,116 issued on Nov. 26, 2013 to Jeffery Dahl discloses a Loop Rope Assembly. The assembly includes a main rope segment having a plurality of rope strands and first and second ends, a first end loop provided on the first end of the main rope segment, a second end loop provided on the second end of the main rope segment and at least one intermediate loop defined by at least one of the rope strands. While this rope provides multiple securing locations along the rope, it is basically a linear device and won't secure broad cargo.

What is needed is a cargo securing mechanism that is used horizontal and vertical to attach to each other to create different lengths, depending on the structure and size of the load. The Monkey Grabs cargo holding Strap discloses in this document provides the solution.

BRIEF SUMMARY OF THE INVENTION

It is an object of the monkey grip cargo hold to secure cargo. The cargo can be in or on a vehicle, but the cargo could also be secured on a pallet, shelf or rack. Because cargo can take a variety of different configurations the monkey grip cargo hold is configurable to accommodate a variety of different shapes and sizes to retain cargo or boxes in an essentially fixed secure position.

It is an object of the monkey grip cargo hold to eliminate the frustration with other cargo holding systems with only having four tied down areas in a standard truck bed, and cargo nets which do not secure your loads, and are limited to sizes. Monkey Grabs are designed to take the standard four tied down areas in the bed of a vehicle and convert to 24 optional tied down areas. This creates a net affect that makes a much more secure load. Monkey Grabs are designed to be used horizontal and vertical to attach to each other to create different lengths, depending on the structure and size of the load.

It is another object of the monkey grip cargo hold to not include any metal components. Many people have a great deal of pride with their vehicles, and exhort great care to ensure that the paint is not damaged or scratched. When loading a vehicle, truck or trailer, the straps will not scratch, dent, chip or create any damage to the vehicle. The repair costs of a scratch that reaches the base metal can be expensive, the monkey grip cargo hold has no hard surfaces that can cause harm to the exterior or interior of the vehicle.

It is still another object of the monkey grip cargo hold to have multiple securing loops along lengths of the straps for a user to connect into the ends and along the length of the strap to create additional securing locations. This makes the monkey grip cargo hold a far more useful cargo hold. The monkey grip cargo hold is configured in a rectangular configuration to connect along the sides of the bed of a truck and also placed across the bed for more versatile uses of the monkey grip cargo hold.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 shows a top plan view of the monkey grip cargo hold.

FIG. 4 shows a right side view of the monkey grip cargo hold.

DETAILED DESCRIPTION OF THE INVENTION

Figure 1:
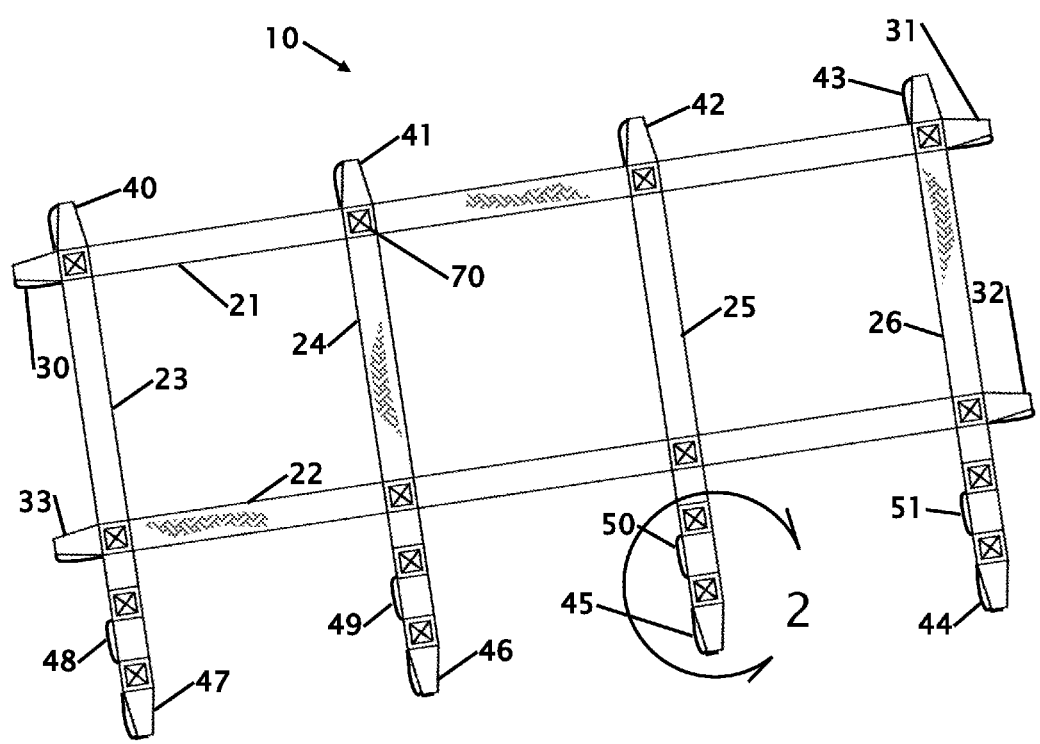
FIG. 1 shows a perspective view of the monkey grip cargo hold.

FIG. 1 shows a perspective view of the monkey grip cargo hold 10. The monkey grip cargo hold 10 is essentially constructed with two horizontal strap members 21 and 22 that are sewn two four vertical strap members 23, 24, 25 and 26. At the extreme ends of all of the straps the end of the strap is looped and sewn back onto itself to form loops 30, 31, 32, 33, 40, 41, 42, 43, 44, 45, 46 and 47. In addition to the loops, the strap material at one end is sewn intermittently to provide additional loops 48, 49, 50 and 51. Where the material is folded, looped or overlaps the strap material is sewn 70 to prevent movement between the straps. The straps are sewn together to form a lattice.

The monkey grip cargo hold 10 is preferably fabricated from a nylon mesh or similar material. While nylon mesh is identified as the preferred material, the monkey grip cargo hold 10 can be fabricated from cotton or other materials based upon the strength requirements and the need to repel fluids such as water, gas. The entire monkey grip cargo hold 10 is fabricated without any metal components that can cause harm or damage to the interior or exterior of a vehicle. A standard cargo hold only provides four locations to secure the cargo hold to a vehicle. These locations are typically 30, 31, 32 and 33. The monkey grip cargo hold 10 increases the number of tie-down locations to 14, namely 30-33, 40-51, other locations between the sewn straps can also be used to increase the tie-down locations to 24.

Multiple monkey grip cargo hold straps 10 can be linked together to form a specific or desired length or size. (for example) Can go to 8 ft, 12 ft, 16 ft, etc., in a horizontal or a vertical orientation. The monkey grip cargo hold straps 10 has uses to hold loads for campers, BMX riders, trash Haulers, weekend movers, recyclers, toy haulers, vacationers, delivery trucks, people with SUV's people with SUV's, MX Riders and anyone looking to have a secure load.

Figure 2:
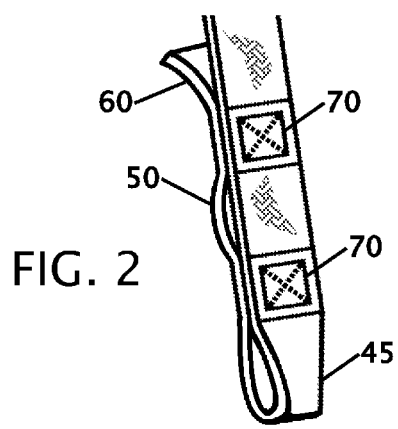
FIG. 2 shows a detail perspective view of an end loop of the monkey grip cargo hold from the area 2 identified in FIG. 1.

FIG. 2 shows a detail perspective view of an end loop of the monkey grip cargo hold 10 from the area 2 identified in FIG. 1. This detail shows that the ends of the monkey grip cargo hold 10 are narrowed to increase the structural strength of the monkey grip cargo hold 10 in the critical area where a user will hook or otherwise secure the monkey grip cargo hold 10 to a vehicle, pallet or other hole, hook or eyelet. This detail view also shows that a free end of material 60 is contemplated. While in the embodiment shown the free end 60 is fairly short, the free end 60 can be a sufficient length to secure the free end 60 is a clamp or tied to something.

FIG. 3 shows a top plan view of the monkey grip cargo hold 10 and FIG. 4 shows a right side view of the monkey grip cargo hold 10. The monkey grip cargo hold 10 gives you 24 extra locations to tie down your load down rather than the standard 4 30, 31, 32 and 33 that come stock on a truck bed. The monkey grip cargo hold 10, holds load securely in place to keep your stuff from shifting and moving while truck is performing work duties or recreational activities. The grabs 30-33, 40-51, can be mounted to all four sides of the bed of the truck. The size, shape and multiple mounting location reduces potential cuts or frustration from a user reaching in the bed of a truck after the truck is loaded to put the hook back on after it falls off.

Figure 5:
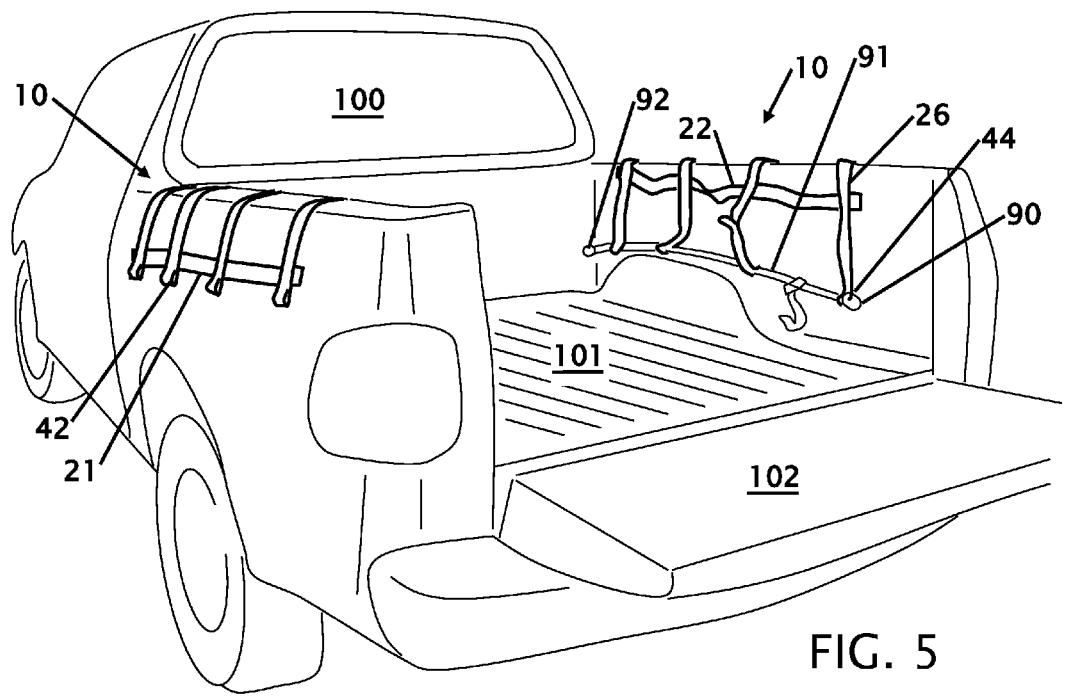
FIG. 5 shows a pair of monkey grip cargo holds installed on a truck.
Figure 6:
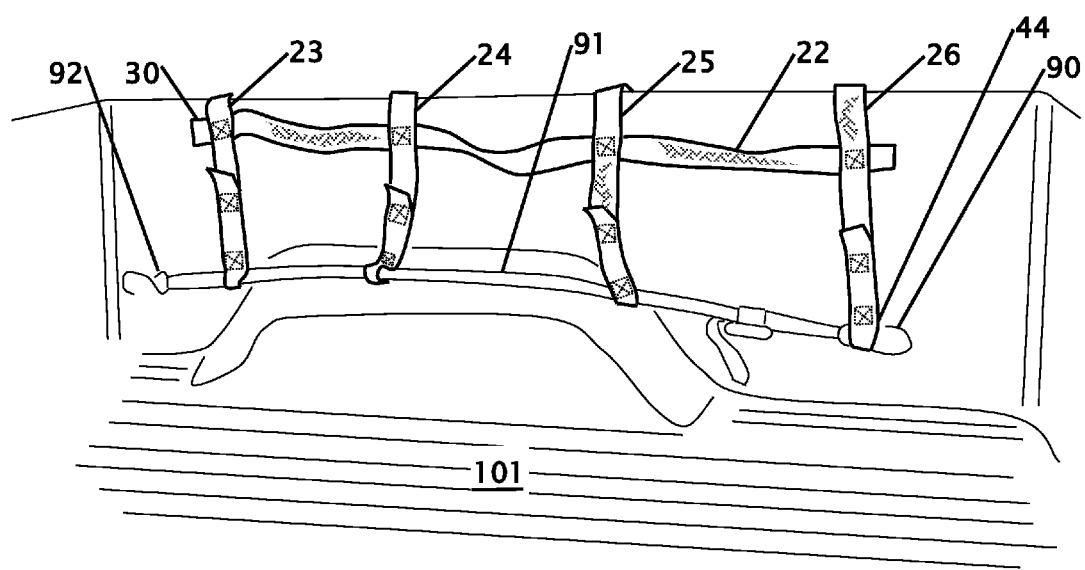
FIG. 6 shows a single monkey grip cargo hold installed on a truck side wall.

FIG. 5 shows a pair of monkey grip cargo holds 10 installed on a truck 100. For clarity, the truck 100 is shown with the truck bed 101 and the tailgate 102 lowered. A monkey grip cargo holds 10 is installed on each side of the sidewalls of the bed of the truck 100 where the monkey grip cargo holds 10 is secured into the holes, hooks or tie-down locations 90 and 92 incorporated into a truck bed 101 or truck bed side walls. The monkey grip cargo holds 10 are shown secured and folded over the sidewalls of the truck 100. In the embodiment shown the monkey grip cargo holds 10 is secured between the tie-downs 90 and 92 with a strap 91 connected to the tie-downs and passes through the end loops of the monkey grip cargo holds 10. FIG. 6 shows this in greater detail.

FIG. 6 shows a single monkey grip cargo hold 100 installed on a truck side wall. To install the monkey grip cargo holds 10 in a truck, an installer lays one monkey grip cargo holds 10 over the side of the bed 101 of the truck 100. A ratchet strap tied down 91 of up to a 1"½ in diameter is passed through the four eyes 44, 45, 46 and 47 which are located on the bottom of the four vertical strap 23, 24, 25 and 26 on the monkey grip cargo holds 10. The installer then hooks the ratchet strap hooks 90 and 92 to each corner on the side and ratchet it until secure in place. This process can then be repeated on the other side of the truck bed.

In addition to the installation that is shown and described, the monkey grip cargo holds 10 can be secured across the bed 101 of the truck 100 between opposing side walls. After installation the monkey grip cargo holds 10 can be dropped into the bed 101 of the truck, of cargo can then be secured with the monkey grip cargo holds 10. Additional monkey grip cargo holds 10 can be secured to the free ends of the monkey grip cargo holds 10 to retain loads that extend above the truck bed.

Thus, specific embodiments of a monkey grip cargo hold have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A set of at least two monkey grabs cargo holds, each cargo hold comprising:
at least a pair of elongated horizontal strap members;
at least four vertical strap members sewn to each of said at least a pair of elongated horizontal strap members;
opposing ends of each of said at least a pair of elongated horizontal strap members are looped and sewn at two opposing distal ends of said at least four vertical strap members;
a first end of one of said at least four vertical strap members looped and sewn to one of said at least a pair of elongated horizontal strap members;
a second end of said one of at least four vertical strap members being looped and sewn onto itself in at least two separate locations thereby creating at least a first loop and a sequential second loop extending from said one of said at least a pair of elongated horizontal strap members;
said first loop being in proximity to an outside one of said elongated horizontal members and said first loop formed with a loop of material created by sewing a longer strap length to a shorter strap length thereby creating an open loop, wherein said open loop creates an open securable connection when ones of said loops are under tension;
a first of said set of at least two monkey grabs being secured to a passenger side interior side wall of a bed of a vehicle, and
a second of said set of at least a set of two monkey grabs being secured to a driver side interior side wall of said bed of said vehicle and said first and said second monkey grabs cargo holds are connected together to increase a strap coverage area.

2. The set of at least two monkey grabs cargo holds according to claim 1 wherein said set of at least two monkey grabs cargo holds does not include any metal materials.

3. The set of at least two monkey grabs cargo holds according to claim 1 wherein said set of at least two monkey grabs cargo holds is fabricated from nylon.

4. The set of at least two monkey grabs cargo holds according to claim 1 wherein said set of at least two monkey grabs cargo holds is orientable in a vertical or a horizontal orientation.

5. The set of at least two monkey grabs cargo holds according to claim 1 wherein said set of at least two monkey grabs cargo holds is usable by a group consisting of campers, BMX riders, trash haulers, weekend movers, recyclers, toy haulers, vacationers, delivery trucks, people with SUV's and MX riders.

6. The set of at least two monkey grabs cargo holds according to claim 1 wherein said at least four vertical strap members further include an elongated free-end of material.

* * * * *